United States Patent [19]

Harbeke

[11] Patent Number: 4,669,759
[45] Date of Patent: Jun. 2, 1987

[54] FIRE-STOP STACK FITTING AND METHOD OF USING SAME

[76] Inventor: Gerold J. Harbeke, 2807 S. Military Trail, Lake Worth, Fla. 33463

[21] Appl. No.: 818,631

[22] Filed: Jan. 14, 1986

[51] Int. Cl.⁴ ............................................. F16L 5/00
[52] U.S. Cl. .................................... 285/158; 52/220; 277/26; 277/189
[58] Field of Search ............... 52/220, 221, 232; 137/72, 74; 169/48; 174/48, 49; 248/56; 277/26, 184, 189; 285/910, 925, 158, 192

[56] References Cited

U.S. PATENT DOCUMENTS

| | | | |
|---|---|---|---|
| 3,294,358 | 12/1966 | Hagedorn | 249/175 |
| 3,346,230 | 10/1967 | Tolf, Jr. | 249/177 |
| 4,237,667 | 12/1980 | Pallucci et al. | 52/221 |
| 4,261,598 | 4/1981 | Cornwall | 285/56 |
| 4,313,286 | 2/1982 | Harbeke | 52/220 |
| 4,404,983 | 9/1983 | Scheurenbrand et al. | 137/74 |
| 4,424,867 | 1/1984 | Mallow | 169/43 |
| 4,453,354 | 6/1984 | Harbeke | 52/220 |
| 4,458,460 | 7/1984 | Kohaut | 52/221 |
| 4,619,087 | 10/1986 | Harbeke | 52/221 |
| 4,619,471 | 10/1986 | Harbeke | 285/158 |
| 4,623,170 | 11/1986 | Cornwall | 285/4 |

FOREIGN PATENT DOCUMENTS 2162251 6/1973 Fed. Rep. of Germany ........ 169/48
2615428 6/1976 Fed. Rep. of Germany .

OTHER PUBLICATIONS

Coastal Construction Products, Inc., Section 07251, "Intumescent Fireproofing".

*Primary Examiner*—John E. Murtagh
*Assistant Examiner*—Andrew Joseph Rudy
*Attorney, Agent, or Firm*—Griffin, Branigan & Butler

[57] ABSTRACT

A fire-stop stack fitting (34) includes a cylindrically-shaped coupling wall (36) having a stop (52) therein for receiving pipes to be coupled from first and second ends. The first end of the cylindrically-shaped coupling wall is affixed to a cavity forming wall (42) defining a cavity which is open in an inwardly radial direction and in a first-end axial direction but which is closed in an outwardly radial direction and in a second-end axial direction. An attachment flange (46) is affixed to the first end of the cavity-forming wall for attaching the fire-stop stack fitting to a concrete form (50). An intumescent material (44) is placed in an intumescent-material cavity (62) and the flange of the fire-stop stack fitting is fastened to a concrete form wall. After concrete (56) has hardened and the form wall (50) is removed, pipes (38, 40) are inserted in opposite ends of the cylindrically-shaped wall (36). The intumescent-material is quickly heated by fire on the first side of the wall since the intumescent-material cavity is open to that side and the intumescent material is free to expand radially into the pipe (40) inserted into the first end of the fitting.

7 Claims, 4 Drawing Figures

FIRE-STOP STACK FITTING AND METHOD OF USING SAME

BACKGROUND OF THE INVENTION

This invention relates generally to the art of pipe networks for buildings and especially to apparatus and systems for making fire-retardant pipe networks.

Until recently, pipe networks were normally extended through floors of buildings by forming holes in the walls—e.g. by using void-forming devices during the "pouring" of the floors, by knocking out holes, by boring such holes after the floors had been formed, etc.—and thereafter extending pipes through these holes. Normally the holes were made to be bigger than the pipes to ensure that one could easily extend the pipes through the holes. Thereafter, it was necessary for workmen to fill the spaces between the pipes and the holes with cement or some other substance in order to meet fire codes which generally do not allow holes in floors.

There have been a number of patent documents published such as German Offenlegungsschrift No. 2,615,428, Harbeke (4,453,354) and Cornwall (4,261,598) disclosing the concept of cementing pipe-coupling joints into floors when the floors are poured and thereafter, mating external pipes to female opposite ends of the embedded coupling joints. Such a practice is normally carried out with plastic pipe, however, it could also be carried out with pipes made of other materials.

A major fire problem which still exists for plastic pipe-coupling joints which are embedded in floors is that when there is a fire the fire will melt the external plastic pipes and then pass up through the pipe-coupling joints themselves to the next higher floors. In other words, the pipe coupling joints themselves serve as ventilation holes for fires. It is an object of this invention to provide an assembly and structure for extending a pipe network through a building floor using embedded plastic pipe coupling joints without allowing the pipe joints themselves to become fire ventilation holes.

It is a further object of this invention to provide a method and assembly for embedding a pipe coupling joint in a concrete floor in such a manner that in the event of a fire the coupling joint is closed off to the flow of air, heat and fire through the coupling joint.

It is a further object of this invention to provide a fire-retardant fluid coupling which acts quickly enough to prevent a fire from spreading to the next higher story through a bore of the fluid coupling.

It has been suggested to use mechanical valves for closing off embedded pipe coupling joints in case of fire, however the operation of such mechanical valves deteriates over time so that when fires occur many years after a building has been built the valves may not properly function. It is an object of this invention to provide an embedded fire-retardant pipe coupling joint which does not involve mechanically moving parts.

It is still another object of this invention to provide such a fire-retardant fluid coupling which can be easily mounted on a concrete form for embedding the coupling in concrete.

SUMMARY

According to this invention, a fire-stop stack fitting comprises a cylindrically-shaped coupling wall with a stop therein for receiving pipes from opposite first and second ends thereof, a intumescent-material cavity forming wall at the first end of said cylindrically-shaped wall for forming an intumescent-material cavity which is open in an inwardly radial direction and a first-end axial direction but which is closed in an outwardly radial direction and in a second-end axial direction, and an attachment flange affixed to a first end of the cavity-forming wall with which the fire-stop stack fitting can be attached to a concrete form. The intumescent-material can be prestored in the intumescent-material cavity before the fire-stop stack fitting is attached to a concrete form. Thus, once the form wall is removed, the intumescent material is open to heat from a fire on a first side of a concrete wall formed with the concrete form for heating the intumescent material and expanding it radially inwardly against a pipe extending into the cylindrically-shaped wall from its first end.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
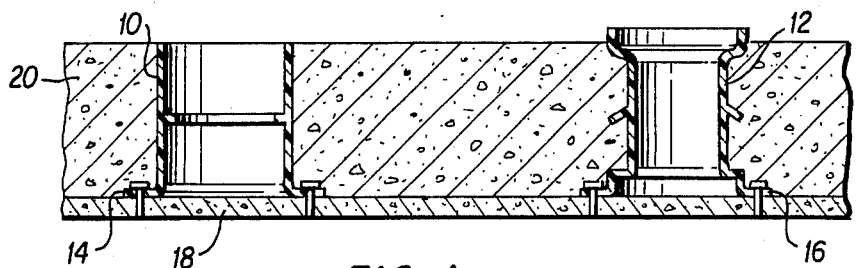
FIG. 1 is a side sectional view of prior-art fluid-conveying, pipe-coupling joint mounted on a wooden form wall and embedded in a concrete floor.

In the prior-art, two types of fluid conveying pipe coupling joints 10 and 12 (FIG. 1) have flanges 14 and 16 thereon which are fastened to a wooden concrete form wall 18. Concrete 20 is then poured into the form to embed the coupling joints 10 and 12 in the concrete 20. A difficulty with these prior-art coupling joints is that once the form wall 18 is removed and plastic pipes are coupled into opposite ends of these pipe coupling joints 10 and 12 they are not fire retardant. That is, should a fire occur below the concrete wall 20, it will melt the pipes extending into the bottoms of the coupling joints 10 and 12, pass through these joints to pipes above the concrete wall 20, then melt through these pipes above the wall 20, and spread to other flamable structures above the wall 20. Thus, the fire relatively easily bridges the barrier formed by the wall 20. Such prior-art coupling joints are respectively depicted and described in U.S. Pat. Nos. 4,261,598 to Cornwall and 4,453,354 to Harbeke.

Figure 2:
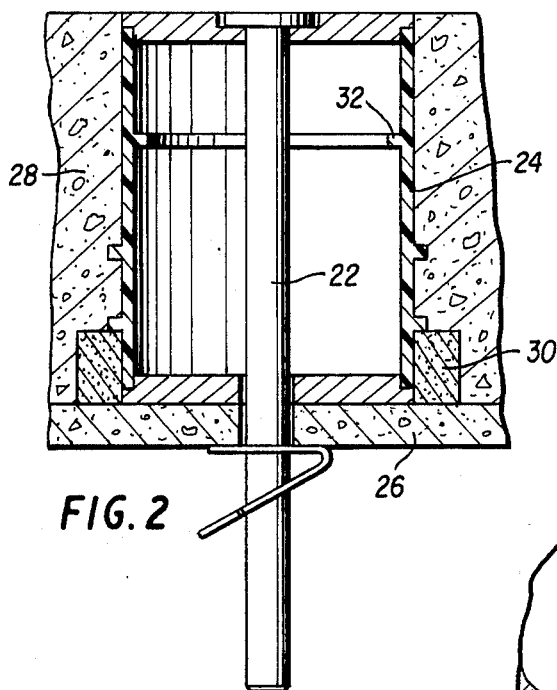
FIG. 2 is a side, partially sectional, view illustrating a previously-suggested apparatus and a method for creating a fire-retardant fluid coupling (not prior art) as shown in U.S. patent application 06/729,495 filed May 1, 1985, now U.S. Pat. No. 4,619,087.

In order to prevent such spreading of fires from a lower story to a higher story of a building I have previously suggested the assembly shown in FIG. 2 which basically comprises a pipe-coupling joint support apparatus 22 for holding a female/female pipe coupling joint 24 to a concrete form wall 26 while a concrete floor 28 is being poured. Before the concrete floor 28 is poured, an intumescent material wrap 30 is placed about the lower mouth of the pipe coupling joint 24. The pipe-coupling joint support apparatus 22 and the concrete form wall 26 are removed once the concrete has cured. Pipes are then inserted into the pipe coupling 24 from above and below the floor 28 to contact a stop 32 and to be coupled with the pipe-coupling joint 24 by an adhesive. A fire in the story below the concrete wall 28 causes heat which freely contacts the lower edge of the intumescent wrap 30 thereby heating the wrap, causing this wrap to expand radially inwardly, and thereby closing off the bore of the pipe coupling joint 24 and the pipe extending therein from the bottom to prevent the spreading of this fire to the story above the concrete wall 28.

Although the arrangement of FIG. 2, from a fire prevention point-of-view, has vast improvements over the fluid-conveying pipe-coupling joints of FIG. 1, it requires workers responsible for installing coupling joints on concrete form walls to stock and maintain the separate pipe-coupling joint support apparatus 22 and also to bore holes in the concrete form wall 26. This can be costly both in time, money and space not to mention the damage caused to the concrete form wall 26.

The invention of this application comprises a single integral fire-stop stack fitting 34 having a cylindrically-shaped coupling wall 36 for coupling to plastic pipes 38 and 40, a cavity forming wall 42 for housing an intumescent material 44 and a flange 46 having holes 48 therein for fastening the fire-stop stack fitting 34 to a concrete form wall 50. The fire-stop stack fitting 34 is a single, molded, integral plastic piece as can be seen in FIG. 4.

Figure 4:
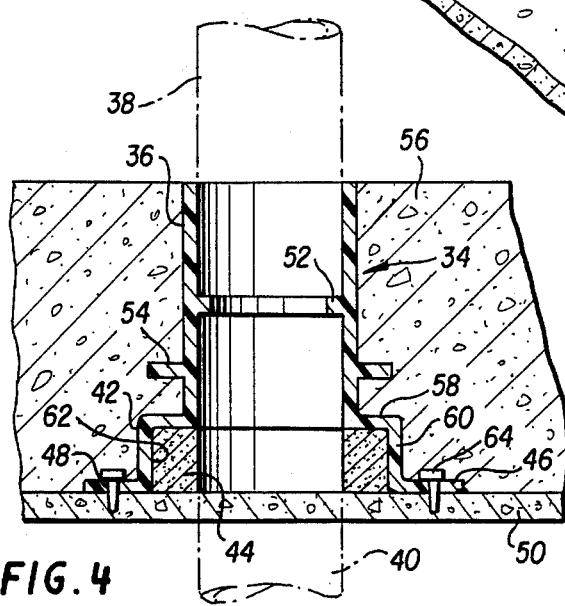
FIG. 4 is a side sectional view of the element shown in FIG. 3 but with pipes being depicted therein in dashed line to show how they are coupled with the fire-stop stack fitting of this invention once it is embedded in a concrete wall.

The cylindrically-shaped coupling wall 36, as can be seen in FIG. 4, forms a female/female coupling with a stop 52 therein for snugly receiving the pipes 38 and 40, whose ends contact the stop 52, and being adhered thereto. On the outer surface of this cylindrically-shaped wall coupling 36 is a riser clamp 54 for anchoring the fire-stop stack fitting 34 in concrete 56 so that the fire-stop stack fitting 34 will not fall downwardly out of the cured concrete 56.

The cavity forming wall 42 has an upper horizontal wall 58 which extends radially outwardly and a vertical sidewall 60 which extends axially downwardly from the upper wall 58 to thereby form an annularly shaped cavity 62 which is outside, but adjacent to, space to be occupied by the pipe 40. In this respect, the annularly-shaped cavity 62 should be of a sufficient size to allow the storage of sufficient intumescent material for closing the plastic pipe 40 should a fire occur. It should be noted that the annularly-shaped cavity 62 is open on its bottom side facing the concrete form wall 50 and on its inner side facing the space where pipe 40, shown in FIG. 4, is to be placed. By being open on these two sides, the intumescent material can be quickly contacted and heated by a fire occuring below the concrete 56 once the concrete form wall 50 has been removed and the intumescent material 44 is free to expand inwardly on the pipe 40.

Figure 3:
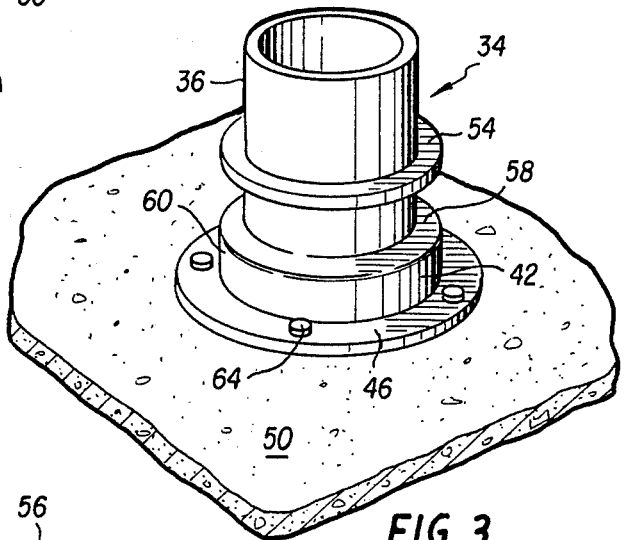
FIG. 3 is an isometric view of a fire-stop stack fitting of this invention shown mounted on a wall of a concrete form.

The flange 46 is attached to the lower end of the sidewall 60 of the cavity forming wall 42 and extends radially outwardly so that nails 64 and the like passing through the holes 48 can be used for attaching the fire-stop stack fitting 34 to the concrete form wall 50 as is shown in FIGS. 3 and 4.

The wrap of intumescent material 44, in a preferred embodiment, is a fire barrier strip/wrap FS-195 manufactured by 3M of Saint Paul, MN, however, it can also be caulk #CP-25 or puddy 303, both of which are also manufactured by 3M. Again, its thickness and height are designed to expand such that it closes off the internal bore of pipe 40 in case of a fire.

In operation, one who is responsible for attaching pipe coupling joints to a form wall 50 for making a pour of concrete 56 of a particular depth selects (which might include fashioning) fire-stop stack fittings 34 of a length which equals the thickness of the concrete pour. The annularly-shaped cavities 62 of these fire-stop stack fittings 34 have been prefilled with the intumescent material 44. That is, this material has been properly shaped and glued or otherwise attached in the annularly-shaped cavities 62. The fire-stop stack fittings are nailed, screwed or otherwise attached to the concrete form wall 50 at locations where plumbing stacks are to pass through the concrete floor 56. After the concrete 56 has been poured and cured the concrete form wall 50 is removed. A plumber then couples the fire-stop stack fittings 34 with stack pipes 38 and 40. In one embodiment of this invention, the intumescent material 44 is fitted into the annularly-shaped cavity 62 at a factory and sold as a unit. In an alternate embodiment of this invention, the intumescent material 44 is placed in the annularly-shaped cavity 62 either prior to, or subsequent to, the pouring of the concrete 56 by an on-site worker. In either case, this would not be possible if these cavities were not of a sufficient size for holding the required amount of intumescent material.

It will be understood by those skilled in the art that the fire-stop stack fitting 34 of this invention including the intumescent material 44 provides an excellent fire-stop stack fitting which, because of the exposure of the intumescent material 44 to the room below the concrete 56 and to the pipe 40, responds quickly to heat in the room and closes off the pipe 40. This benefit is provided by a one piece unit which does not require plumbing contractors to maintain and use separate mounting devices for mounting the unit on a concrete form. One benefit of the arrangement of this invention over that of FIG. 2 is that the intumescent material 40 must only collapse one pipe 44 in this arrangement whereas in the FIG. 2 arrangement it must collapse both the pipe coupling joint 24 and the pipe coupled thereto.

While the invention has been particularly shown and described with reference to preferred embodiments, it will be understood by those skilled in the art that various changes in form and detail may be made therein without departing from the spirit and scope of the invention.

The embodiment of the invention in which an exclusive property or privilege is claimed are defined as follows;

1. A fire-stop stack fitting for providing a fire-retardant fluid-conveying pipe coupling joint embedded in a concrete barrier, said stack fitting comprising:
    a cylindrically-shaped coupling wall having opposite first and second ends for forming a passage therethrough, said cylindrically-shaped coupling wall having opposite openings for receiving fluid conveying pipes therein to be coupled therewith, said cylindrically-shaped coupling wall further comprising a stop means positioned inside said passage for contacting the ends of first and second fluid conveying pipes inserted into the respective opposite first and second ends of said cylindrically-shaped coupling wall for preventing said pipes from passing further through said cylindrically-shaped coupling wall, said stop means having an internal surface which is exposed to fluids passing through said cylindrically-shaped coupling wall between said fluid conveying pipes inserted into opposite ends thereof;

a cavity-forming wall whose second end is ridgedly affixed to said first end of said cylindrically-shaped wall and which is longitudinally spaced from said stop means, said cavity-forming wall defining an intumescent-material cavity extending about the circumference of said first fluid conveying pipe inserted into said opening at said first end which is open in an inwardly radial direction and in a first-end axial direction, said intumescent-material cavity being of a size for holding a sufficient amount of intumescent material for expanding radially inwardly, when heated, upon said first fluid conveying pipe and thereby closing off said first fluid conveying pipe; and, an attachment flange ridgedly affixed to said fire-stop stack fitting for attaching said fire-stop stack fitting to a concrete form, said flange extending radially outwardly at a first end of said cavity forming wall;

whereby, said fire-stop stack fitting can be attached to a concrete form wall by fastening said attachment flange to said concrete form wall to thereby leave an intumescent-material cavity in a concrete wall which, when said concrete form wall is removed, is open from a first side of said concrete wall and which is adjacent to a pipe coupled to said first end of said cylindrically shaped coupling wall so that intumescent material located in said intumescent material cavity is quickly heated by a fire on said one side of said wall and is free to expand radially inwardly against said pipe.

2. A fire-stop stack fitting as in claim 1, wherein said cylindrically-shaped wall, said cavity-forming wall, and said attached flange are formed of a single integral part.

3. A fire-stop stack fitting as in claim 2, wherein said single integral part is constructed of plastic.

4. A fire-stop stack fitting as in claim 2, wherein said fire-stop stack fitting includes intumescent material mounted in said intumescent material cavity.

5. A fire-stop stack fitting as in claim 4, wherein said cylindrically shaped coupling wall further includes a riser clamp mounted externally on said cylindrically-shaped coupling wall for extending radially outwardly therefrom and thereby anchoring said fire-stop stack coupling fitting in a concrete wall in which it is embedded.

6. A fire-stop stack fitting as in claim 1, wherein said fire-stop stack fitting includes an intumescent material mounted in said intumescent material cavity.

7. A method of preparing a fire-stop plumbing stack comprising the following steps:

selecting a flanged type fluid-conveying coupling joint to be attached by means of the flange to a concrete form wall, said flanged coupling joint having a cylindrically-shaped coupling wall with opposite openings for receiving first and second fluid-conveying pipes therein to be coupled therewith and a cavity-forming wall attached to said coupling wall at its first end for forming a cavity below said cylindrically-shaped coupling wall and above the flange but radially outside of a space in which said first pipe to be coupled to the joint is to be located, said cavity being open toward the flange end of the coupling and radially inwardly, said coupling having a stop means positioned inside said cylindrically-shaped coupling wall for contacting ends of first and second fluid-conveying pipes inserted into the respective openings of said first and second opposite ends of said cylindrically-shaped coupling wall;

placing sufficient intumescent material in said cavity for closing said first pipe surrounded by said cavity and coupled to said coupling joint when said intumescent material is heated.

attaching said flange to a concrete form wall and thereafter filling said form with concrete to embed said coupling joint, with said intumescent material in said cavity, in said concrete; and, attaching said first and second pipes to the ends of said coupling joint, with said first pipe being surrounded by said cavity and said intumescent material.

* * * * *